(12) United States Patent
Rahgozar

(10) Patent No.: US 8,820,421 B2
(45) Date of Patent: Sep. 2, 2014

(54) FIRE FIGHTING SYSTEM AND METHOD FOR FIRES IN JUNGLES, REFINERIES AND OIL PIPELINES

(76) Inventor: Naser Rahgozar, Tehran (IR)

( * ) Notice: Subject to any disclaimer, the term of this patent is extended or adjusted under 35 U.S.C. 154(b) by 1063 days.

(21) Appl. No.: 12/824,182

(22) Filed: Jun. 27, 2010

(65) Prior Publication Data

US 2010/0263886 A1 Oct. 21, 2010

Related U.S. Application Data

(60) Provisional application No. 61/300,040, filed on Jan. 2, 2010.

(51) Int. Cl.
*A62C 3/02* (2006.01)
*B64D 1/16* (2006.01)

(52) U.S. Cl.
CPC ............. *A62C 3/0242* (2013.01); *A62C 3/0235* (2013.01); *B64D 1/16* (2013.01)
USPC ................. 169/53; 169/52; 169/71; 239/171; 244/136

(58) Field of Classification Search
USPC ........... 169/30, 34, 43, 46, 47, 51–53, 70, 71, 169/74, 77, 85, 89; 239/171; 244/136
See application file for complete search history.

(56) References Cited

U.S. PATENT DOCUMENTS

| | | | | |
|---|---|---|---|---|
| 3,494,423 A | * | 2/1970 | Stansbury et al. | 169/43 |
| 3,661,211 A | * | 5/1972 | Powers | 169/53 |
| 3,828,857 A | * | 8/1974 | Mason | 169/53 |
| 4,240,507 A | * | 12/1980 | Hokkanen | 169/53 |
| 4,376,466 A | * | 3/1983 | Hara | 169/53 |
| 5,123,491 A | * | 6/1992 | Luchs | 169/69 |
| 5,326,053 A | * | 7/1994 | Pahl et al. | 244/136 |
| 5,385,208 A | * | 1/1995 | Baker et al. | 169/46 |
| 5,829,809 A | * | 11/1998 | Arney et al. | 294/68.21 |
| 6,688,402 B1 | * | 2/2004 | Wise | 169/53 |
| 2003/0146005 A1 | * | 8/2003 | Brooke et al. | 169/53 |
| 2005/0178565 A1 | * | 8/2005 | Voss | 169/53 |
| 2008/0314601 A1 | * | 12/2008 | Cafferata | 169/34 |
| 2009/0126952 A1 | * | 5/2009 | Xuan-Do | 169/53 |
| 2009/0223682 A1 | * | 9/2009 | Ramos | 169/46 |
| 2010/0018725 A1 | * | 1/2010 | Ramos Rodriguez | 169/53 |

* cited by examiner

*Primary Examiner* — Darren W Gorman
(74) *Attorney, Agent, or Firm* — Barry Choobin; Patent 360 LLC

(57) ABSTRACT

The various embodiments herein provide a system and method for fire extinguishing in forests. The fire extinguishing system herein includes a first storage tank, a second storage tank, a first fire extinguishing element, a second fire extinguishing element, a cover provided on top side of the first storage tank, a compressed air inlet, an air regulator, one or more hosing hasps, one or more tarpaulin hoses, one or more hooks, one or more clips and locks, a nozzle attached to a bottom side of the tank and a pipe to lead compressed air to nozzle. In the first stage the helicopter carries the sand tank from the station/depot to the firing woods and starts bombarding the sand around and top of the fire and a second helicopter carries the water tank from the station to the top of the bombarded flames and starts spraying water before the flame starts again.

15 Claims, 18 Drawing Sheets

FIRE FIGHTING SYSTEM AND METHOD FOR FIRES IN JUNGLES, REFINERIES AND OIL PIPELINES

This application claims the benefit of Provisional Application No. 61/300,040 filed Feb. 1, 2010.

BACKGROUND

1. Technical Field

The embodiments herein generally relates to the fire extinguishing systems and methods. The embodiments herein particularly relates to a method of extinguishing fire in forests, refineries, oil storages and pipelines. The embodiments herein more particularly relates to a method and system employing sand as at least one natural material for extinguishing fires.

2. Description of the Related Art

The most extensive disasters nowadays which damage our global environment and threaten life are forest fires occurring seasonally, by which more and more greenery is destroyed and life is endangered. The destruction of forests and elements of life by fires leads to ecological damage. Extensive fires also result in abandonment of mountainous areas by populations moving to plains and large cities which are connected with increases in water consumption, resulting to biological damage and to water balance alterations which may result to changes in face of the Planet. These changes of habitat have resulted to in the abandonment of the vast mountainous areas which largely control the water balance and the biological action on the Earth.

One of the methods to control forest fires is the use of helicopter in hovering above the fire while dispensing a fire extinguishing substance there from. The helicopter delivers fairly sizable quantities of water to the scene of a fire from a nearby lake or other body of water. For this purpose, a large container may be suspended beneath the helicopter from its cargo hook, with the quantity of water corresponding to the load-carrying capabilities of the helicopter.

Further it is obvious that water is the best and effective natural material in these kinds of fires extinguishing. However most quantity of the sprinkled water evaporates before causing any significant influence on the flame due to the high temperature of the flames. Usually the distance between fires and water resources are too far. Therefore water will be provided with delays in the next steps. Thus the total controlling of the flames using water as a fire extinguishing medium will be fruitless and the fire continues its expansion without any restrictions.

Hence there is a need for a fire fighting system that would eliminate the time of flight to a water source, reduce water refilling time and efficiently flight back to the fire.

The abovementioned shortcomings, disadvantages and problems are addressed herein and which will be understood by reading and studying the following specification.

SUMMARY

The primary object of the embodiments herein is to provide an improved fire extinguishing system and method with an efficient fire extinguishing element.

Another object of the embodiments herein is to provide a fire extinguishing system which provides for fast refilling and shifting of the fire extinguishing element into the storage for fire extinguishing.

Yet another object of the embodiments herein is to provide an airborne sand blasting system for fire extinguishing.

Yet another object of the embodiments herein is to provide a fire extinguishing system with multiple types of nozzles for extinguishing fires in different environments.

Yet another object of the embodiments herein is to provide a fire extinguishing system at reduced cost.

These and other objects and advantages of the present invention will become readily apparent from the following detailed description taken in conjunction with the accompanying drawings.

The various embodiments herein provide a method and system for fire extinguishing in forests, refineries and oil pipelines. The fire extinguisher system comprises a first storage tank, a first fire extinguishing element filled in the first storage tank, a cover provided on top side of the tank, a compressed air inlet, an air regulator, one or more hosing hasps, one or more tarpaulin hoses, one or more hooks provided on opposite sides of the tank, one or more clips and locks, a nozzle attached to a bottom side of the tank and a pipe to lead compressed air to nozzle. The tank is covered with the cover and locked by the clips and locks and the compressed air inlet is connected to the air regulator and then connected to a first hosing hasp, the first hosing hasp is connected to the first tarpaulin hose and the first tarpaulin hose is connected to second hosing hasp and the second hosing hasp is connected to the steel pipe and the steel pipe is connected to the third hosing hasp and the third hosing hasp is connected to second tarpaulin hose and the second tarpaulin hose is connected to the nozzle thereby providing a pathway for the first fire extinguishing element which is to be sprayed over flames to the nozzle. In the first stage, the helicopter carries the first storage tank from the station/depot to the firing woods and starts bombarding the sand around the fire. Further the second helicopter carries the second storage tank from the station to the top of the bombarded flames in the first stage and starts spraying water before the flame starts again. Here the first storage tank is adapted to carry sand and thus is also referred as sand tank. As the second storage tank carries water, the second storage tank is also termed as water tank.

According to one embodiment, the collection of sand from the coasts or deserts will be done by people living in those areas with the sifters. Here the sand is filtered in the shifters and then transported to the station/depot.

According to one embodiment, the shifted sand from the station/depot is filled to the sand tank, before filling, the sand is dried in the dryer provided in the shifter and then filled to the sand tank.

According to one embodiment, the electric power for heating machine/dryer in the shifter is supplied by the tractor or trucks in the depots/stations.

According to one embodiment, the rotating power for the sifter and spiral shaft is supplied by the back shaft of the tractors.

According to one embodiment, the hanging of the sand tank and water tank from the helicopter includes a horizontal steel rod fixed under the helicopter and the flexible tarpaulin hose is provided at the center for compressed air entrance. Two wheels are provided on both the sides of the steel rod. The steel ropes are made to roll over the said wheels and then connected to the water/sand tank with the hooks provided on the body of the sand/water tank.

According to one embodiment, the sand is filled into the sand tank and covered with the cover. The cover is locked by the clips and locks. The compressed air inlet is provided at the top center of the tank and connected to the air regulator and then connected to first hosing hasp. The first hosing hasp is connected to the first tarpaulin hose and the first tarpaulin hose is connected to second hosing hasp. The second hosing hasp is connected to the steel pipe and the steel pipe is connected to the third hosing hasp and the third hosing hasp is connected to the second tarpaulin hose. The second tarpaulin hose is connected to the nozzle. The compressed air blown form the helicopter flows through the air regulator, hosing hasps, tarpaulin hose, steel pipes and reaches nozzle for sand blasting. The hooks are provided on either side of the tank for carrying the tank to the firing woods.

According to one embodiment, the water is filled in the water tank and the compressed air inlet is connected to the first easy open hasp. The first easy open hasp is connected to the steel pipe and the steel pipe is connected to the second easy open hasp. The second easy open hasp is connected to the tarpaulin hose and the tarpaulin hose is connected to the third easy open hasp. The third easy open hasp is connected to the nozzle of the water filled tank. The compressed air blown form the helicopter flows through the easy open hasps, tarpaulin hose, steel pipes and reaches nozzle for spraying water on firing woods. The hooks are provided on either side of the tank for carrying the tank to the firing woods.

According to one embodiment, the compressed air for the sand blasting and the water spraying is supplied by air compressor which is temporary installed in the helicopter.

According to one embodiment, different types of nozzles such as type-1 including concave nozzle, flat nozzle and convex nozzle, type-2 including cylindrical nozzle and conical nozzle, type-3 nozzle and type-4 nozzle, are used in the sand tank for sand blasting depending on the topology of forests and fires.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present invention are shown in some drawings and not in others. This is done for convenience only as each feature may be combined with any or all of the other features in accordance with the present invention.

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method and system for fire extinguishing in forests, refineries and oil pipelines. The fire extinguishing system of one embodiment herein includes the sand tank, the water tank, the shifter/dryer and one or more helicopters for carrying the sand and water tanks to the firing woods. In the first stage the helicopter carries the sand tank from the station/depot to the firing woods and starts bombarding the sand around and top of the fire and then the second helicopter carries the water tank from the station to the top of the bombarded flames in the first stage and starts spraying water before the flame starts again.

Figure 1:
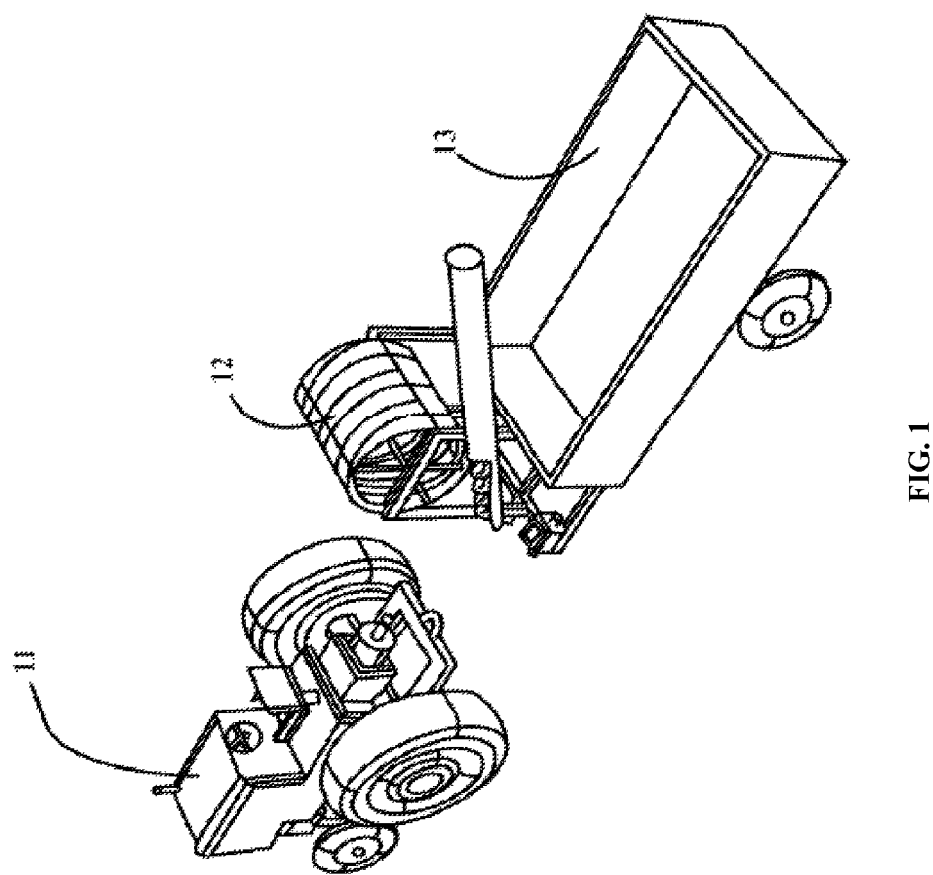
FIG. 1 illustrates a side perspective view of the tractor and trailer with rotate able shifter for collecting sand from the coasts or deserts according to an embodiment of the present disclosure.

FIG. 1 illustrates a side perspective view of the tractor and trailer with rotate able shifter for collecting sand from the sea/coasts or deserts according to an embodiment of the present disclosure. The collection process for sand includes the employment of a tractor 11 towing a trailer 13. The trailer 13 includes a sifter 12, which is rotatable. The sifters 12 provides for collecting sand from sea/ocean coasts or deserts. The laborers jobs in the sea/ocean coast or deserts are only shifting sands and separating the sand which is then used as a fire extinguishing medium. The in-useable sand (siftings) is then returned back to their places exactly during the shifting.

The filtered sand is poured in the trailer 13 and the tractor 11 is used for transporting the sand to the temporary depot/station.

Figure 2:
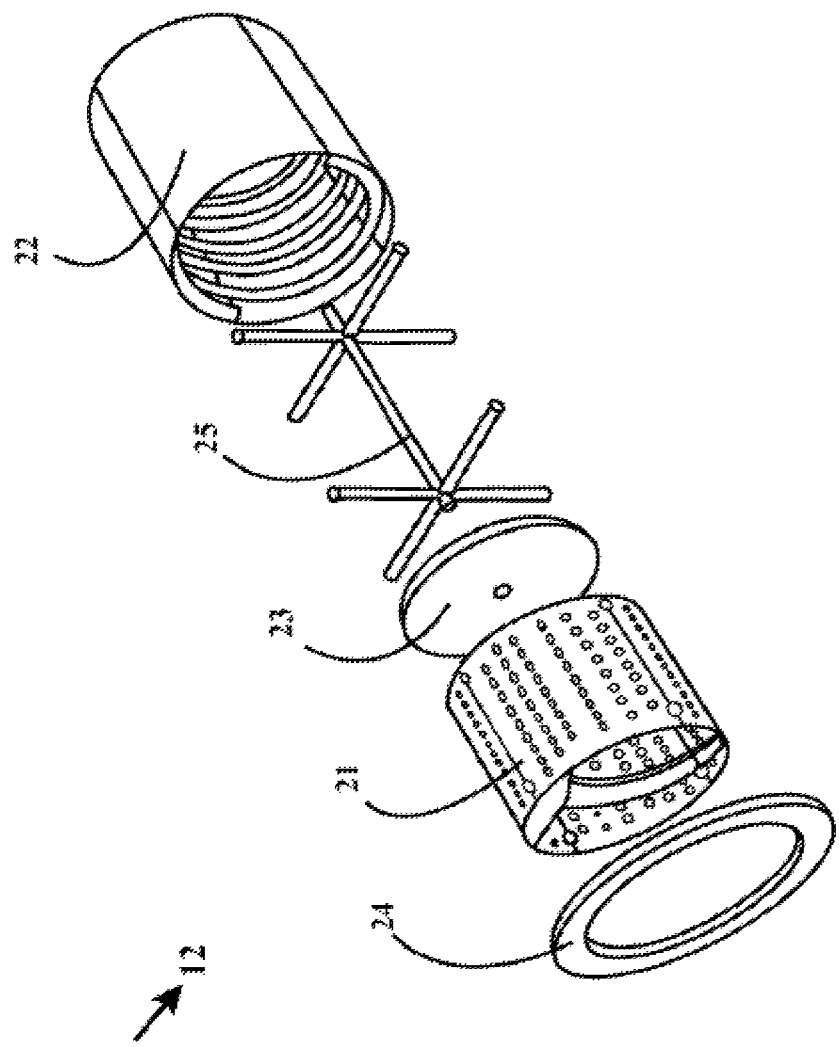
FIG. 2 illustrates an exploded view of the rotate able shifter according to an embodiment of the present disclosure.

FIG. 2 illustrates an exploded view of the rotate able shifter according to an embodiment of the present disclosure. The sifter 12 includes a reticular cylinder 21 with inner spirals for filtering the sand and a cylindrical collector 22 for leading filtered sand to the end of the shifter. The reticular cylinder 21 and the collector cylinder 22 have the same axis and rotate together. The reticular cylinder 21 is provided with an end plate 23 for preventing the mixing of filtered and rubbish sand. The shifter 12 also includes a separator plate 24 for separating the reticular cylinder 21 from the collector cylinder 22. The centralizer rod 25 of the reticular cylinder 21 and the collector cylinder 22 provide the rotating motion for the cylinders in the sifter 12. The rotating motion is provided either by connecting to the back shaft of the tractor 11 or a motor provided in the sifter 12.

Figure 3:
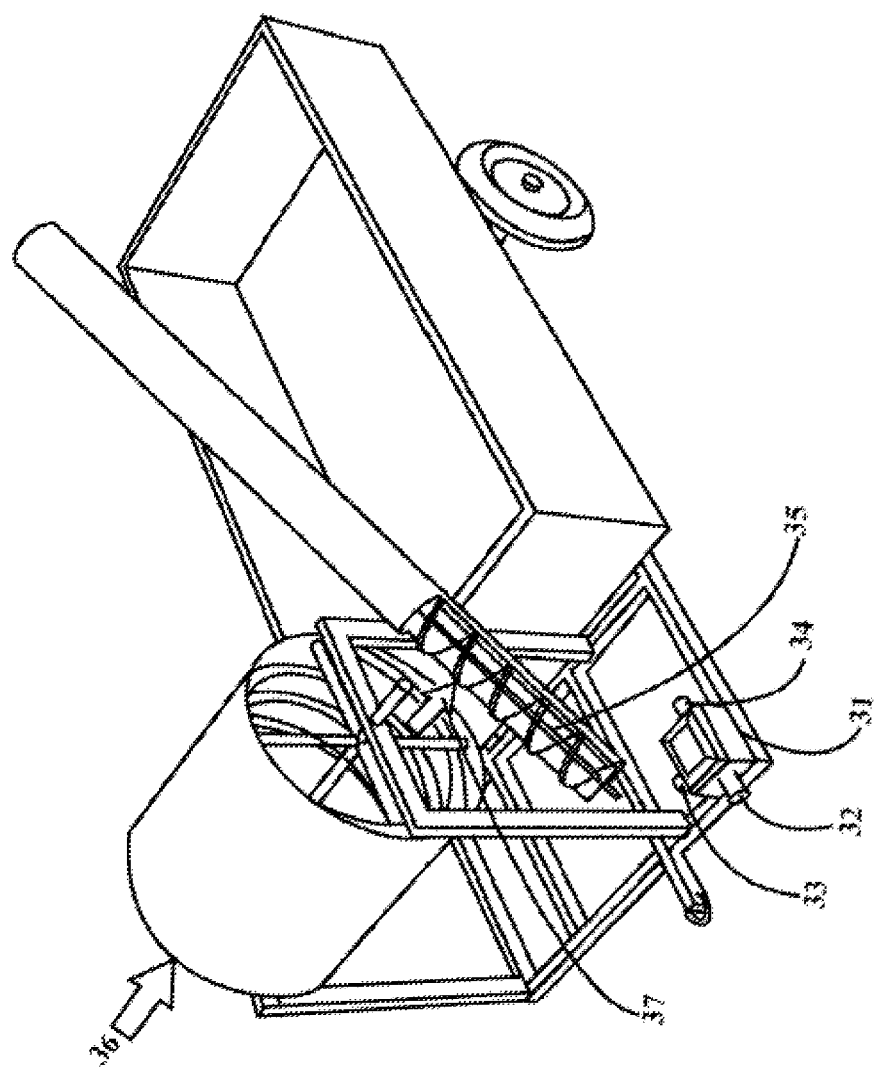
FIG. 3 illustrates a side perspective view of the shifter assembled on the trailer according to an embodiment of the present disclosure.

FIG. 3 illustrates a side perspective view of the sifter assembled on the trailer according to an embodiment of the present disclosure. The tractor 11 is connected to the trailer 13 carrying sand shifter/dryer 12 and the right and left rotatable gearbox 31 is mounted on the trailer 13. One end of the entrance shaft 32 is connected to the tractor 11 and the other end is connected to the right and left rotatable gearbox 31. One end of the right rotatable exit shaft 34 is connected to the right and left rotatable gearbox 31 and the other end is connected to the spiral shaft 35. One end of the right and left rotatable exit shaft 33 is connected to the right and left rotatable gearbox 31 and the other end is connected to the sifter 12. The labor at the sea/ocean coast or desert half loads the reticular cylinder 21 with a spade through the shifter entrance trap-door 36 as shown in FIG. 3. When the key is turned on, two cylinders 21, 22 start rotating to the right side. After a few rotations, the useful sands come into the cylindrical collector 22 which will lead them to the end side of the collector and pour them from the other side through the shifter exit trap-door 37 on to the spiral shaft 35 which will leads the sifted sand (filtered) to the trailer 13. When the key is turned on in the opposite direction, say to the left side, the cylinders start rotating to the other side leading the useless sands to pour on the ground. Further, the reticular cylinder 21 is loaded again and the key is turned to rotate the cylinders to the right side again without creating any delay. Depending on the volume of the cylinder 21 and the trailer capacity 13 one labor can sift almost 10 cubic meter sand per hour.

Figure 4:
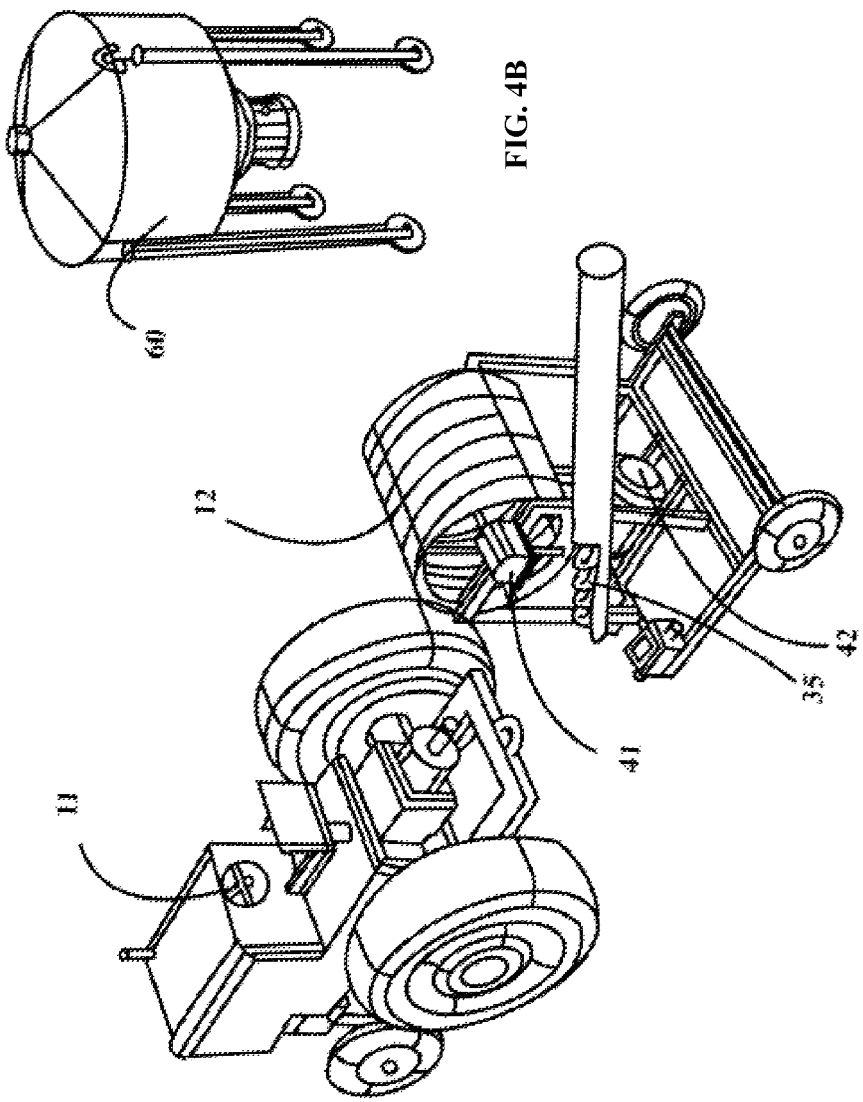
FIG. 4A-4B illustrates a side perspective view of the tractor, the sand shifter/dryer and the sand tank used in the sand station/depot according to an embodiment of the present disclosure.

FIG. 4A-4B illustrates a side perspective view of the tractor, the sand shifter/dryer and the sand tank used in the sand station/depot according to an embodiment of the present disclosure. As shown in FIG. 4A the sifters 12 which are used in the sand depots/stations are provided with a heater. The required sand to be filled in the sand tank 60 should be of less than 1 mm in diameter. The sand is then filtered to achieve the required dimension. The filtered sand is dried to remove the wetness, when the sand to be filled into the tank is wet. The size and dryness of the sand is checked doubly before filling the sand into the sand tank so that the sand blasting/scattering process is performed easily without any stoppage of the sand in the sand nozzle. FIG. 4A and FIG. 4B shows the sizes of the equipments, the connection between the equipments and the level to which the sand tanks 60 needs to be loaded. For drying the wet sands a heater/drying torch 41 is provided as shown in FIG. 4A. The heater/drying torch 41 requires a fuel and electricity for working. Here the fuel can be liquid gas or gas oil/diesel. The liquid gas or gas oil/diesel tank 42 is fixed under the cylinders of the sifter 12 and the required fuel tank is designed based on the customer's requirements. The electricity is provided by battery of the tractor 11 or truck which is available in the station/permanent depot. The rotating power of the sifter 12 and the spiral conveyer/shaft 35 is supplied by the back shaft of the tractor 11.

Figure 5:
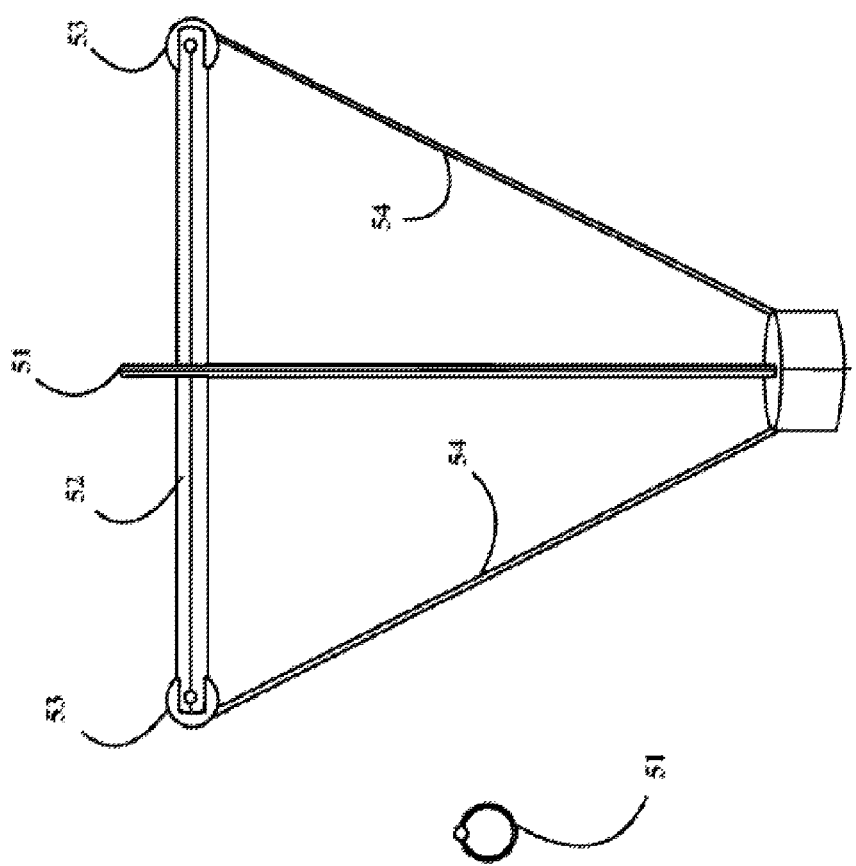
FIG. 5 illustrates the steel rope and the steel rod arrangement for hanging the sand/water tank to the helicopter according to an embodiment of the present disclosure.

FIG. 5 illustrates a rope and rod arrangement for hanging the sand/water tank to the helicopter according to an embodiment of the present disclosure. As shown in FIG. 5, two ropes 54 are provided for hanging the sand tank and the water tank from the helicopters up to the required elevation from 50 meter to 100 meter. These ropes 54 also prevent any uncontrollable movement of the water/sand tanks A rod 52 is fixed horizontally under the helicopter and the flexible tarpaulin hose 51 with a narrow steel rope is sewn to the edge of the hose to prevent to be torn. The compressed air is provided at the center through the flexible tarpaulin hose 51. Two wheels 53 are provided on both the sides of the horizontal rod 52 and the ropes 54 are made to roll over the wheels 53 and then connected to the tanks 60/70 with the hooks provided on the tank body. Tarpaulin hoses are replaced with other suitable hoses with better quality. According to one embodiment, the ropes 54 and the horizontal rods 52 are made of steel or any other suitable material.

Figure 6:
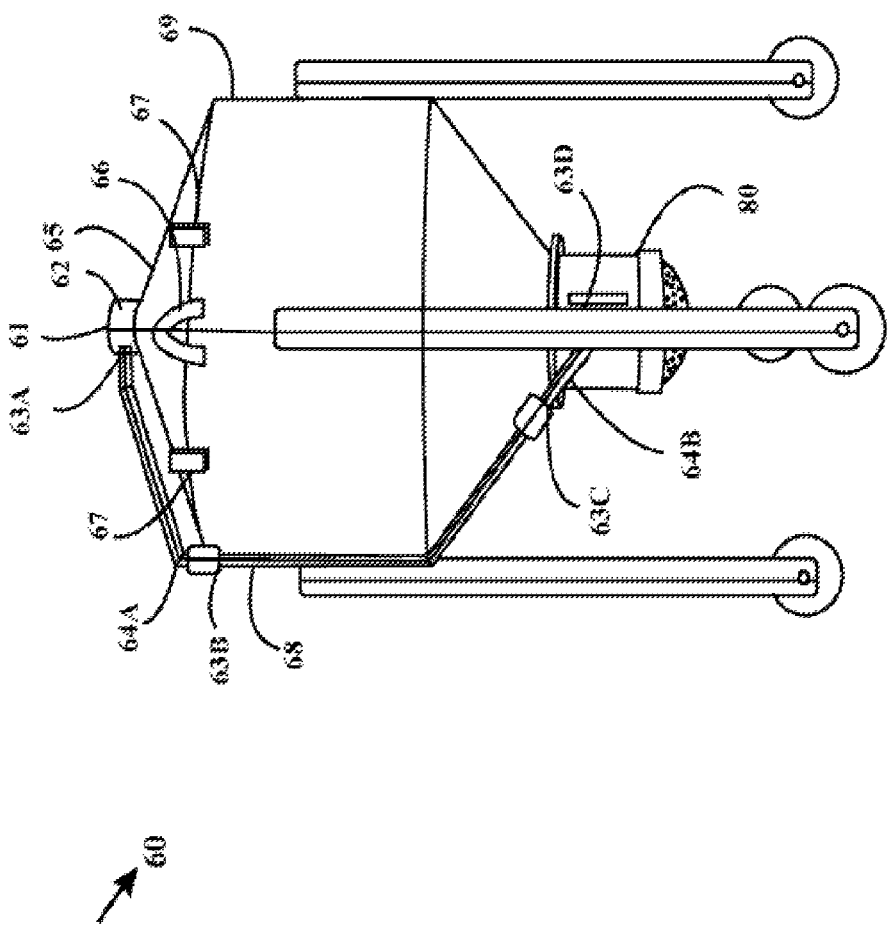
FIG. 6 illustrates a side view of the sand tank with nozzle of type-1 according to an embodiment of the present disclosure.

FIG. 6 illustrates a side view of the sand tank with a nozzle of type-1 according to an embodiment of the present disclosure. The filtered and shifted sands are filled into the sand tank 60 through the door 65 provided on the top of the sand tank 60. The door 65 is locked by the clips and locks 67 as shown in FIG. 6. The air inlet 61 is provided at the top surface of the sand tank 60 through which the compressed air is blown and it is connected to the air regulator 62 for leading and controlling the air direction. Further the compressed air flow path includes, the air regulator 62 connected to a first hosing hasp 63A and first hosing hasp 63A is connected to the first tarpaulin hose 64A. Then the first tarpaulin hose 64A is connected to second hosing hasp 63B and the second hosing hasp 63B is connected to the steel pipe 68. The steel pipe 68 is further connected to the third hosing hasp 63C and the third hosing hasp 63C is connected to second tarpaulin hose 64B. The second tarpaulin hose 64B is connected to the fourth hosing hasp 63D and the fourth hosing hasp 63D is connected to the nozzle 80. The hooks 66 are provided on either side of the tank body 69 for hanging the sand tank 60 to the helicopter. The compressed air blown from the helicopter flows through the air regulator 62, the hosing hasps 63, the tarpaulin hose 64, the steel pipe 68 and then to the nozzle 80. The first helicopter carries the sand tank 60 using the steel rods and ropes as shown in FIG. 5 from the sand station/depot to the firing woods (leading the tank exactly into the flames by keeping helicopter full safety elevation of 50 to 100 meters from the fire). Before arriving into the flame, the nozzle 80 starts bombarding sand around the fire. The vacuum caused by the convection around the fire will attract most of the bombarded sands into the flame from the bottom and around the fire. As sands are small solid element, they will crash to the flaming parts of the subject, simultaneously by reach of the sand tank 60 into the flame, bombarding from the top will cut off all the flames for a while. This leads to the first stage of fire extinguishing.

Figure 7:
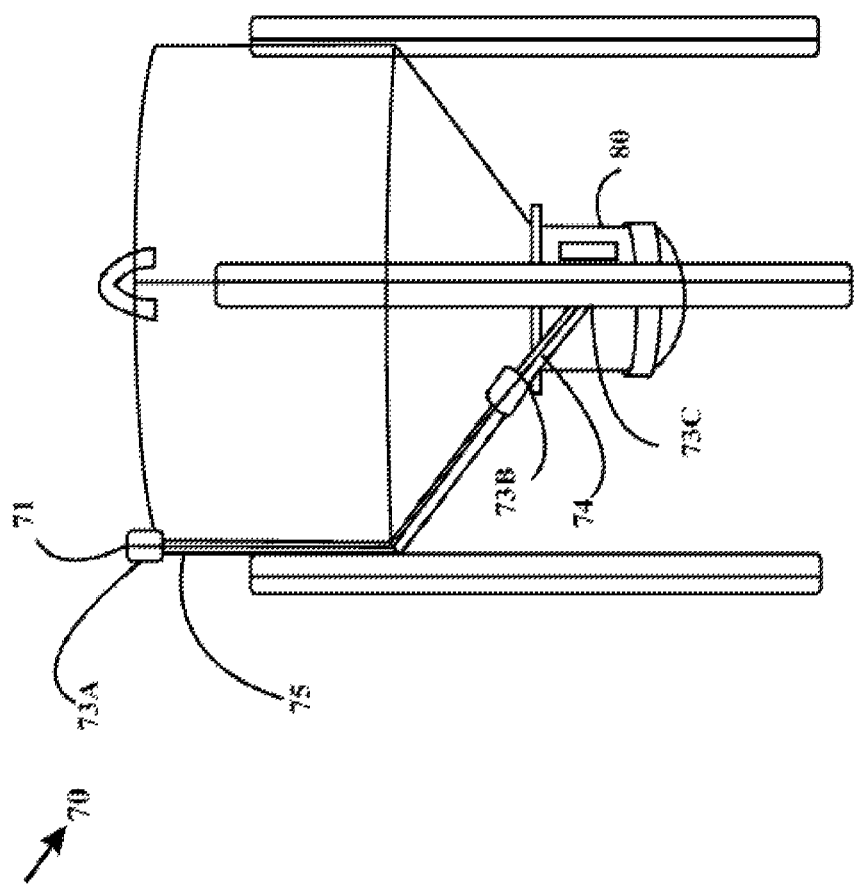
FIG. 7 illustrates a side view of the water tank with nozzle of type-1 according to an embodiment of the present disclosure.

FIG. 7 illustrates a side view of the water tank with a nozzle of type-1 according to one embodiment of the present disclosure. The compressed air inlet 71 is provided on the top corner of the water tank 70 for blowing the compressed air and is further connected to a first easy open hasp 73A. The first easy open hasp 73A is connected to the steel pipe 75. The steel pipe 75 is connected to the second easy open hasp 73B and the second easy open hasp 73B is connected to the tarpaulin hose 74. Then the tarpaulin hose 74 is connected to the third easy open hasp 73C and the third easy open hasp 73C is connected to the nozzle 80 of the water filled tank. The compressed air passed through the inlet 71 follows the path through the easy open hasps 73A-C, steel pipe 75, tarpaulin hose 74 and to the nozzle 80. In the second stage, the helicopter carries the water tank 70 using the ropes and rod as shown in FIG. 5 to the top of the bombarded flames in the first stage for extinguishing fire completely without delay. The compressed air is supplied by the air compressor which is temporary installed in the helicopter (400 liter/8 bar pressure). The air compressor is fixed in the helicopter with easy use hasps. After reaching the firing woods, the compressed air is blown from the helicopter to the nozzle 80 thus spraying the water over the melted (flameless) woods. One tank of water is sufficient for extinguishing the fire, since the sprayed water makes the outside parts of the melted woods wet and cause them insulate against oxygen. Therefore they become charcoal soon.

Figure 8:
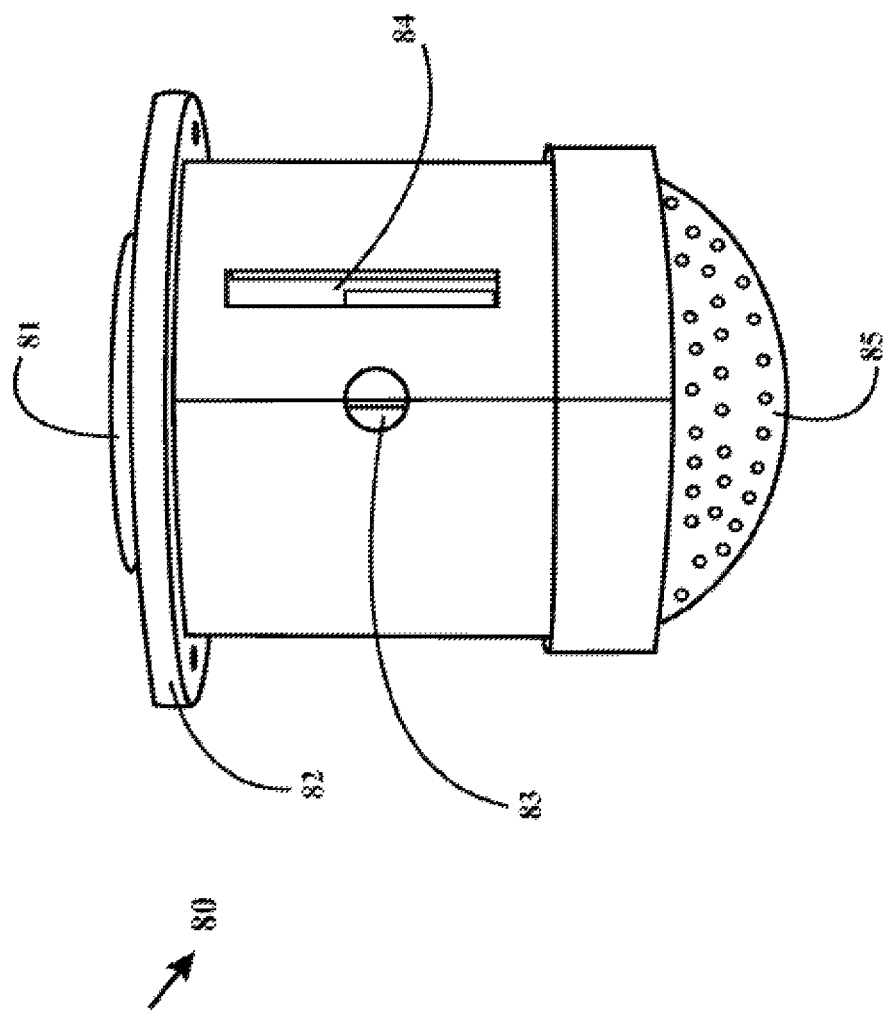
FIG. 8 illustrates a front view of the nozzle of type-1 according to an embodiment of the present disclosure.
Figure 9:
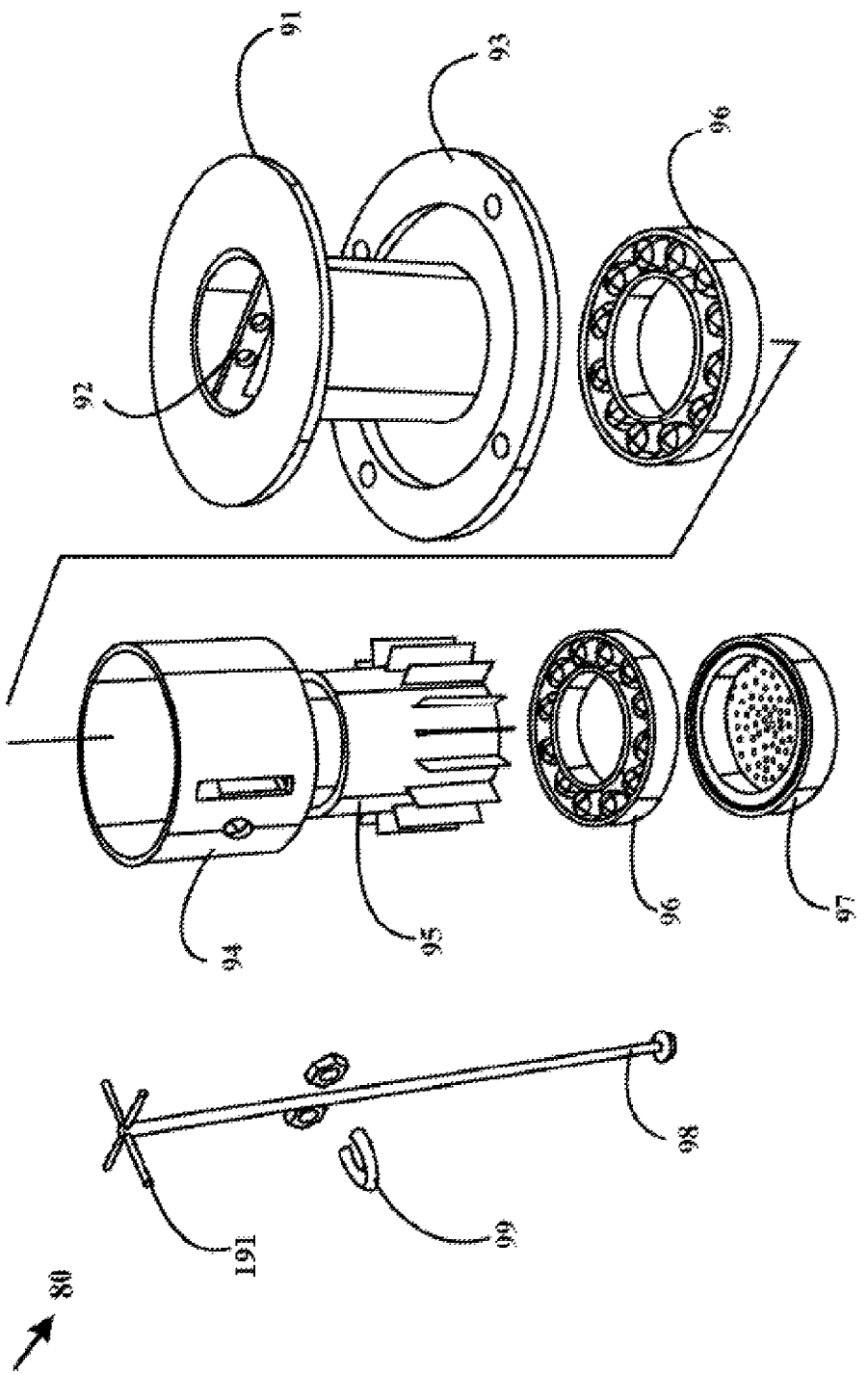
FIG. 9 illustrates an exploded view of the nozzle of type-1 according to an embodiment of the present disclosure.

FIG. 8 illustrates a front view of the nozzle of type-1 and the FIG. 9 illustrates an exploded view of the nozzle of type-1 according to one embodiment of the present invention. As shown in FIG. 8 the sand/water entrance path 81 is provided on the top of the nozzle and the flange 82 is provided on top for connecting the nozzle to the tank. A hole 83 is provided on the outer surface of the nozzle for compressed air entrance to the rotor and a gap 84 is provided for as an exit for the compressed air. The reticular plate 85 is provided at the bottom of the nozzle for shooting sand or spraying water. The nozzle shown in the FIG. 8 and FIG. 9 is of type-1 nozzle (concave) which is centrifugal by rotation with normal scope. To prevent erosion of the reticular plate of the nozzle attached with the sand tank, the reticular plate is made of carbide material. As shown in FIG. 9, an internal fixer rod 92 is provided to fix the rotor assembly firmly in the housing 94 and the connector 93 is used for connecting reticular plate 85 with the housing 94. The rotor 95 with blades is fixed inside the housing 94 and the compressed air blown to the nozzle provides rotatory motion for the rotor blades 95 for bombarding the sand. Ball bearings 96 are provided in the nozzle assembly to reduce the rotational friction and to support radial and axial loads. A central holding rod 98 is provided to fix the rotor assembly firmly in the hosing 94. A connecting plate 93 is provided to connect the nozzle assembly to the sand/water tanks 60 & 70. The rod fixer 99 is provided to fix the central holding rod 98 firmly in the nozzle hosing 94. Top end of the central holding rod 98 is provided with the mixing rod 191 for preventing stoppage of the outgoing sands. A flange 91 is provided to centralize the rotor 95. The reticular plate 97 is provided in the bottom of the nozzle. Ball bearings 96 are provided in the nozzle assembly to reduce the rotation friction and to support radial and axial load. The rotor 95 with blades is fixed inside the hosing 94 and the compressed air blow to the nozzle provides rotatory motion for the rotor blades 95 for bombarding the sand.

Figure 10:
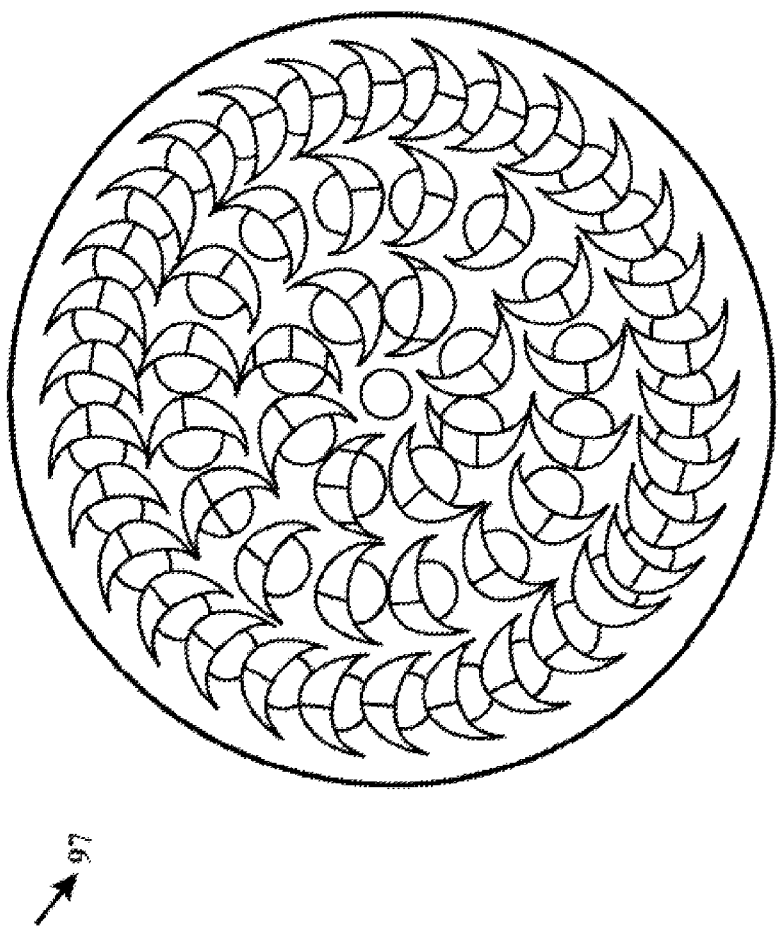
FIG. 10 illustrates the internal reticular surface of the sand tank nozzle of type-1 according to an embodiment of the present disclosure.

FIG. 10 illustrates the internal reticular surface of the sand tank nozzle of type-1 according to one embodiment of the present disclosure. The internal reticular surface of sand nozzles of type-1 is plane in shape. The plane shape reduces the tendency of the sand particles to slip, so that the first acceleration will be faster. Here the reticular plate is made of carbide material to prevent erosion of the plate 85 of the nozzle attached with the sand tank.

Figure 11:
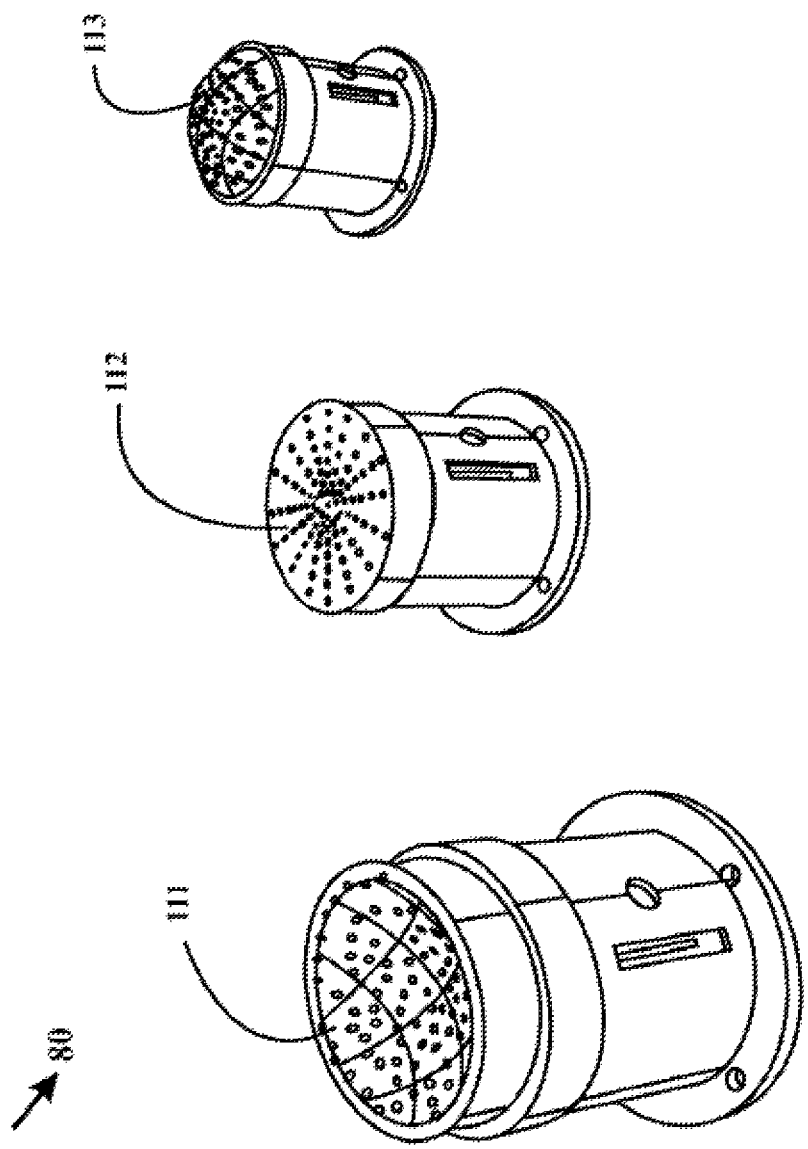
FIG. 11 illustrates the various shape of the nozzle of type-1 according to an embodiment of the present disclosure.

FIG. 11 illustrates the convex nozzle, the flat nozzle and the concave nozzle of type-1 according to one embodiment of the present disclosure. Nozzle 113, the flat nozzle 112 and the concave nozzle 111 are used in fires of bush lands, short and scattered trees area. The construction and arrangement of all the components in the nozzle are same as described in the FIG. 8 and FIG. 9 except the change in the shape of the reticular plates.

Figures 12A, 12B:
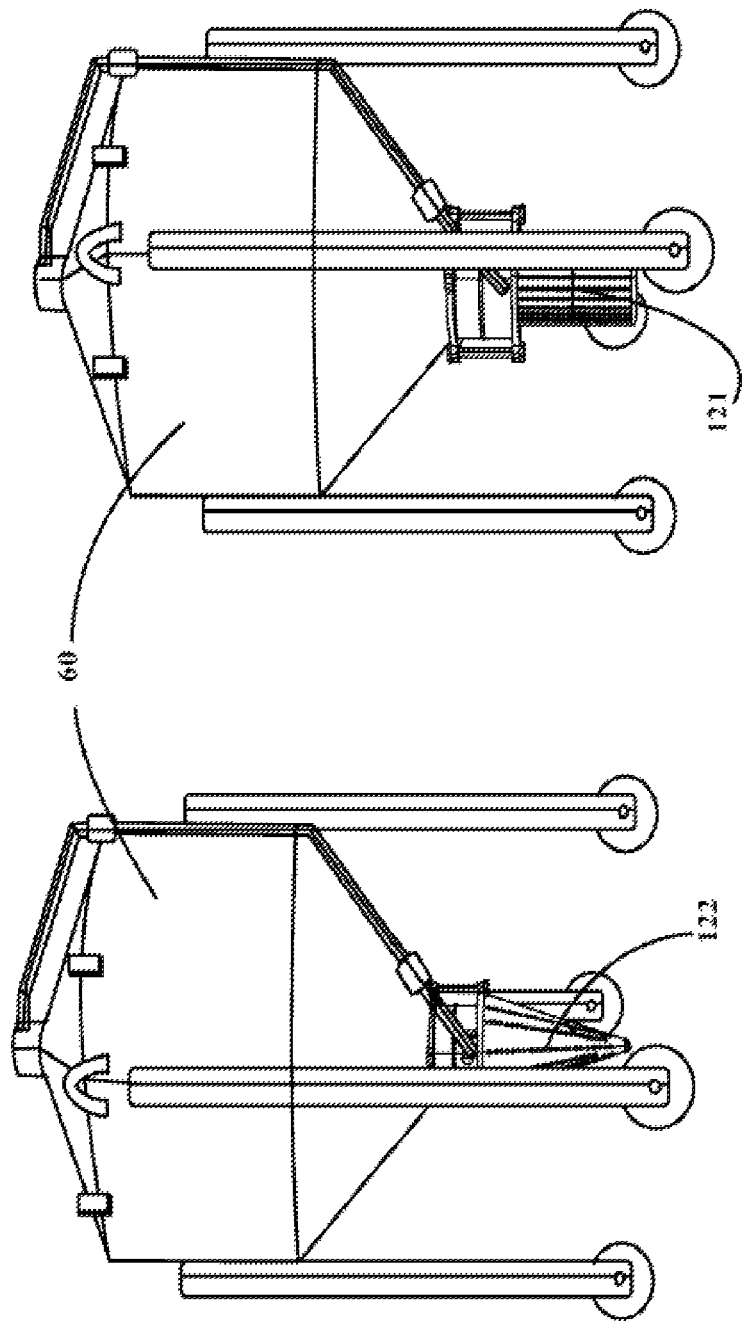
FIG. 12 illustrates the sand tank attached with cylindrical and the conical nozzle of type-2 according to an embodiment of the present disclosure.

FIG. 12 illustrates the sand tank attached with cylindrical nozzle and the conical nozzle of type-2 according to one embodiment of the present invention. The nozzle of type-2 acts in centrifugal by rotation with vaster scope. The cylindrical nozzle 121 and the conical nozzle 122 are used for blasting sand in exuberant forests with tall trees.

Figure 13:
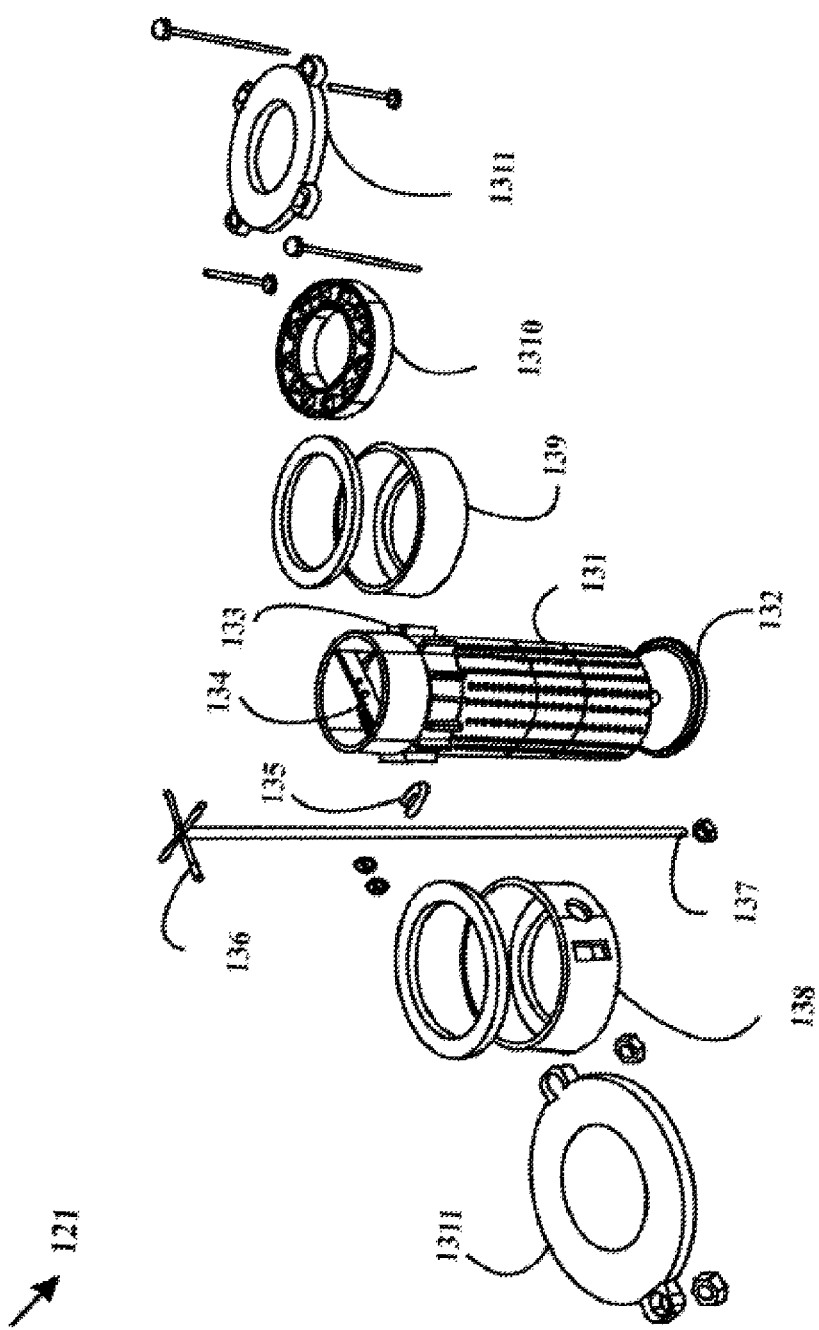
FIG. 13 illustrates the exploded view of the cylindrical nozzle of type-2 according to an embodiment of the present disclosure.

FIG. 13 illustrates the exploded view of the cylindrical nozzle of type-2 according to one embodiment of the present invention. The reticular plate 131 is in the cylindrical shape and is primarily suited for sand blasting in exuberant forests. The reticular cylinder 131 is provided with the bottom holder plate 132 at the bottom for holding the reticular cylinder 131. The rotor blades 133 are provided on the upper part of the reticular cylinder 131 and the compressed air blown to the nozzle provides rotatory motion for the rotor blades 133 for bombarding the sand. The rotor blades 133 are covered with the rotor external housing and a cap 138 for the housing. A central rod holder 134 is provided inside the reticular cylinder 131. The central holding rod 137 is provided at the center for aligning and holding all the components inside the nozzle housing and the central holding rod 137 is fixed with the central rod fixer 135. The central holding rod 137 includes the sand mixer rods 136 on the top section is provided for preventing stoppage of sand in flowing down to the nozzle. Ball bearings 1310 are provided in the nozzle assembly to reduce the rotational friction and to support radial load and axial load. The ball bearings 1310 are placed inside the ball bearing housing 139. Two nozzle holder plates 1311, each plate is placed at the end sections of the nozzle for holding the nozzle and the components of the nozzle firmly and connecting the nozzle to the sand/water tanks 60 and 70.

Figure 14:
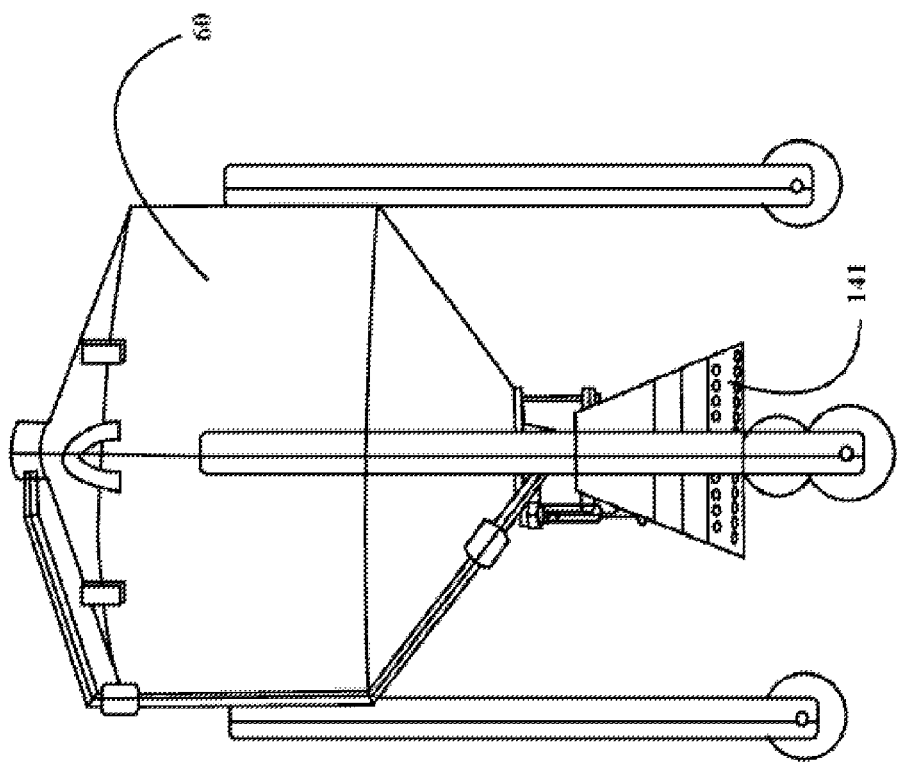
FIG. 14 illustrates the sand tank with a nozzle of type-3 according to an embodiment of the present disclosure.
Figure 15:
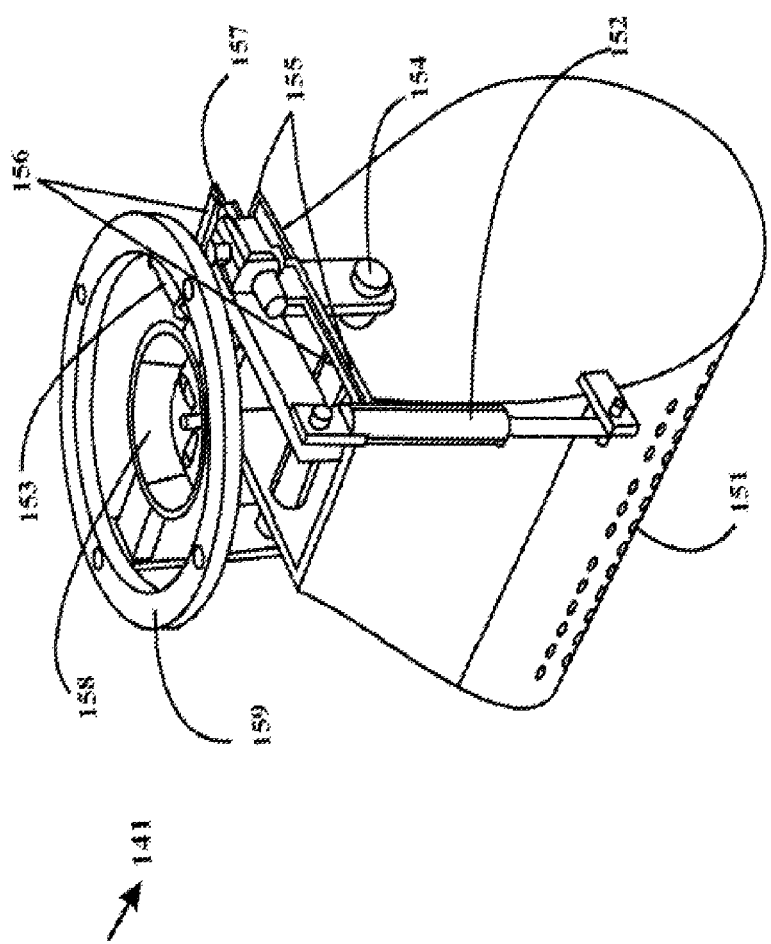
FIG. 15 illustrates a side perspective view of the nozzle of type-3 according to an embodiment of the present disclosure.

FIG. 14 illustrates the sand tank with a nozzle of type-3 according to one embodiment of the present disclosure. FIG. 15 illustrates a side perspective view of the nozzle of type-3 according to one embodiment of the present invention. The reticular sand blaster 151 is provided at the bottom. The pneumatic jacks 152 are provided for pendulum movement. The pneumatic jacks 153 provides for controlling the amount of the sand entrance into the nozzle. The pneumatic jacks 152 and 153 are provided with the pneumatic controller valve 157. The central shaft 154 is provided for supporting the pendulum movement of the nozzle. The compressed air inlet pipe 155 and the compressed air outlet pipe 156 are arranged as shown in FIG. 15. The sand entry controller valve 158 is provided on the top of the nozzle for controlling the amount of sand flow in each cycle of pendulum movement. The connecting plate 159 is provided for connecting the nozzle 141 with the sand tank 60.

Figure 16:
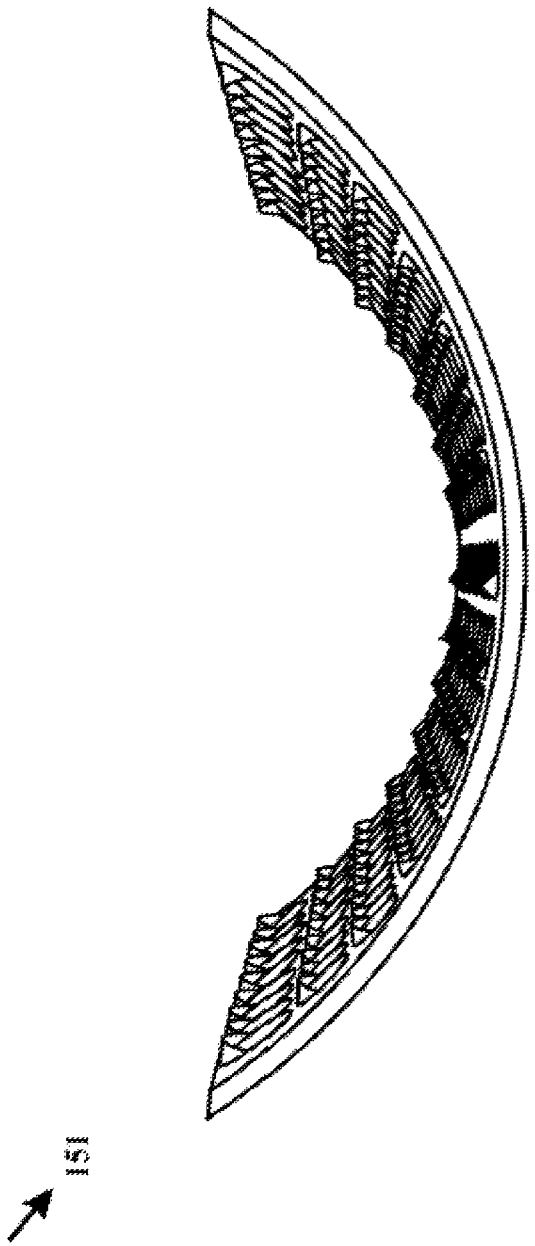
FIG. 16 illustrates a side perspective view of the reticular plate of the nozzle of type-3 according to an embodiment of the present disclosure.

FIG. 16 illustrates a side perspective view of the reticular plate of the nozzle of type-3 according to one embodiment of the present disclosure. The nozzle of type-3 acts in fast pendulum movement with the vastest scope. The inside shape of the reticular plate is made plane form to stop slipping of the sands and the reticular plate material is made of carbide to prevent from erosion.

Figure 17:
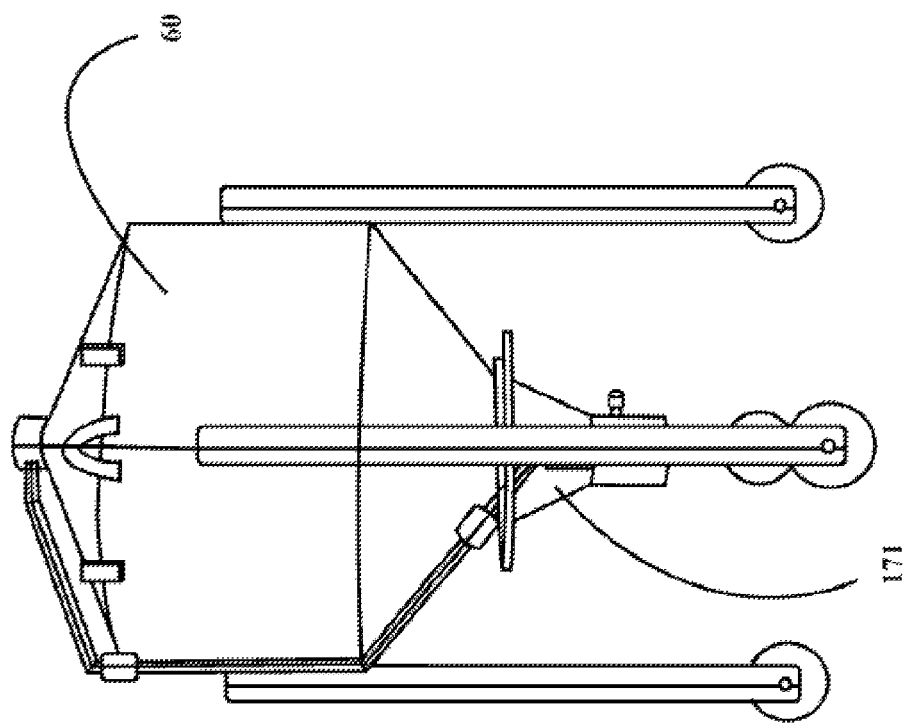
FIG. 17 illustrates the sand tank with nozzle of type-4 according to an embodiment of the present disclosure.
Figure 18:
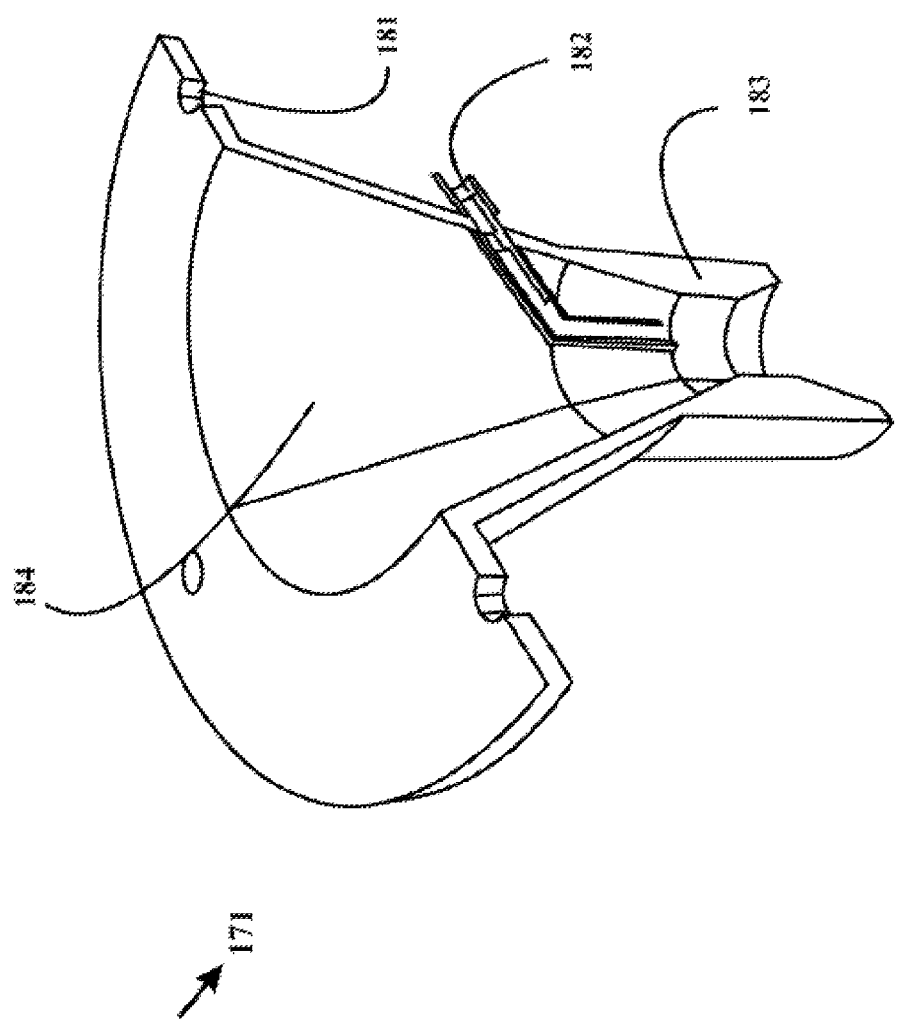
FIG. 18 illustrates the cross section view of the nozzle of type-4 according to an embodiment of the present disclosure.

FIG. 17 illustrates the sand tank with nozzle of type-4 according to one embodiment of the present disclosure. FIG. 18 illustrates the cross section view of the nozzle of type-4 according to one embodiment of the present disclosure. The nozzle of type-4 acts in sand blasting by compressed air manner with the normal scope. The compressed air inlet/entrance pipe 182 is provided on the side wall of the nozzle 171 for blowing compressed air into the nozzle 171. The flange 181 is provided on the top of the nozzle 171 for connecting the sand tank 60 and the nozzle 171. The sand accelerator part 183 is provided at the bottom of the nozzle 171 for bombarding sands on the firing woods. The sand accelerator part 183 is made of carbide material to avoid erosion of the accelerator part 183. The sand entrance 184 will be from the top through the funnel shaped nozzle 171 of type-4 as shown in FIG. 18.

One of the advantages of the present fire extinguishing method is that most of oxygen will be cut off during the sand blasting in the first stage thereby reducing the flame, since sand tank will be led exactly into the flame as closer as possible to the surface of the flaming material, when the nozzle is bombarding the flame from the top. Then the water is sprayed simultaneously on the flames in the second stage for completing the fire extinguishing without delay. Further both systems are used simultaneously to reduce considerable amount of water, costs in fire extinguishing process and expedite success in fire fighting process. Furthermore all the components used in the present fire extinguishing method are light weight, anti-erosion and fire/heat resistant to increase the reliability of the system.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A fire extinguisher system comprising:
   a first storage tank;
   a first fire extinguishing element filled in the first storage tank;
   a cover provided on a top side of the first storage tank;
   a first compressed air inlet;
   a first air regulator;
   a plurality of hosing hasps, and wherein the plurality of hosing hasps includes a first hosing hasp, a second hosing hasp and a third hosing hasp;
   a plurality of tarpaulin hoses, and wherein the plurality of tarpaulin hoses includes a first tarpaulin hose and a second tarpaulin hose;
   a plurality of hooks provided on opposite sides of the first storage tank;
   a plurality of clips and locks;
   a first nozzle attached to a bottom side of the first storage tank; and
   a first pipe to lead compressed air to the first nozzle, and wherein the first pipe is a steel pipe;
   wherein the first storage tank is covered with the cover and locked by the clips and locks; the first compressed air inlet is connected to the first air regulator and then connected to the first hosing hasp; the first hosing hasp is connected to the first tarpaulin hose and the first tarpaulin hose is connected to the second hosing hasp and the second hosing hasp is connected to the first steel pipe and the first steel pipe is connected to the third hosing hasp and the third hosing hasp is connected to the second tarpaulin hose and the second tarpaulin hose is connected to the first nozzle thereby providing a pathway for the first fire extinguishing element which is to be sprayed over flames to the first nozzle, and wherein the compressed air flows through the first air regulator, the plurality of hosing hasps, the plurality of tarpaulin hoses and the first steel pipe to reach the first nozzle for sand blasting.

2. The fire extinguisher system according to claim 1, further comprising a second storage tank including:
   a second fire extinguishing element filled in the second storage tank;
   a second compressed air inlet;
   a second air regulator;
   a plurality of easy open hasps, and wherein the plurality of easy open hasps comprises a first easy open hasp, a second easy open hasp and a third easy open hasp;
   a third tarpaulin hose;
   a plurality of hooks provided on opposite sides of the second storage tank;
   a second pipe, and wherein the second pipe is a steel pipe; and
   a second nozzle;
   wherein the second compressed air inlet is connected to the first easy open hasp and the first easy open hasp is connected to the second steel pipe and the second steel pipe is connected to the second easy open hasp and the second easy open hasp is connected to the third tarpaulin hose and the third tarpaulin hose is connected to the third easy open hasp and the third easy open hasp is connected to the second nozzle of the second storage tank.

3. The fire extinguisher system according to claim 1, wherein the first fire extinguishing element is sand.

4. The fire extinguisher system according to claim 2, wherein the second fire extinguishing element is water.

5. The fire extinguisher system according to claim 2, wherein the plurality of hooks on opposite sides of the first storage tank and the second storage tank provides for hanging the tanks to a helicopter.

6. The fire extinguisher system according to claim 1, wherein the first nozzle comprises:
   an opening on a top side thereof for filling sand thereinto;
   a flange for connecting the first nozzle to the first storage tank;
   an entrance opening to provide the compressed air to a rotor located within the first nozzle; an exit opening for the compressed air; and
   a reticular plate on a bottom of the first nozzle for spraying at least one of sand and water.

7. The fire extinguisher system according to claim 2, further comprising a sand sifter system, comprising:
   a sand sifter;
   a dryer;
   a right rotatable exit shaft;
   a right and left rotatable exit shaft;
   an entrance shaft;
   a right and left rotatable gearbox;
   a tractor;

a trailer carrying the sand sifter; and a spiral shaft to provide sifted sand to the trailer;

wherein the tractor is connected to the trailer carrying the sand sifter, the right and left rotatable gearbox is mounted on the trailer, one end of the entrance shaft is connected to the tractor and the other end thereof is connected to the right and left rotatable gearbox, one end of the right rotatable exit shaft is connected to the right and left rotatable gearbox and the other end of the right rotatable exit shaft is connected to the spiral shaft, and one end of the right and left rotatable exit shaft is connected to the right and left rotatable gearbox and the other end of the right and left rotatable exit shaft is connected to the sand sifter.

8. The fire extinguisher system according to claim 7, wherein the first storage tank, the second storage tank and the sand sifter are made of heat resistant materials.

9. The fire extinguisher system according to claim 2, wherein the first storage tank and the second storage tank are each made of aluminum alloy.

10. The fire extinguisher system according to claim 3, wherein the first storage tank is filled with the sand from a depot and wherein the sand from the depot is wet sand and the wet sand is dried with a dryer before filling into the first storage tank.

11. The fire extinguisher system according to claim 10, wherein the wet sand from the depot is dried with a heating machine before filling the sand into the first storage tank.

12. The fire extinguisher system according to claim 7, wherein a rotating power for the sifter and the spiral shaft is supplied by a back shaft of the tractor.

13. The fire extinguisher system according to claim 2, further comprising a hanging arrangement for hanging one of the first storage tank and the second storage tank from a helicopter, and wherein the hanging arrangement comprises:

a horizontal steel rod;

a flexible fourth tarpaulin hose;

a plurality of steel ropes; and a plurality of wheels, and wherein the plurality of wheels is two wheels;

wherein the horizontal steel rod is fixed under the helicopter and the flexible fourth tarpaulin hose is provided at a center thereof for the compressed air, the two wheels are provided on opposite ends of the steel rod, the plurality of steel ropes are made to roll over the plurality of wheels and then connect to one of the first storage tank and the second storage tank with the plurality of hooks provided on the first storage tank and the second storage tank to hang one of the first storage tank and the second storage tank from the helicopter.

14. The fire extinguisher system according to claim 2, further comprising an air compressor installed in a helicopter to supply the compressed air to the first storage tank or the second storage tank.

15. The fire extinguisher system according to claim 2, wherein the first nozzle and the second nozzle each comprises a reticular plate at a bottom thereof, and wherein the reticular plate is made of carbide material.

* * * * *